Jan. 7, 1964 W. F. HEUSER 3,116,777
TRACTION PAD FOR A VEHICLE WHEEL
Filed Oct. 9, 1962
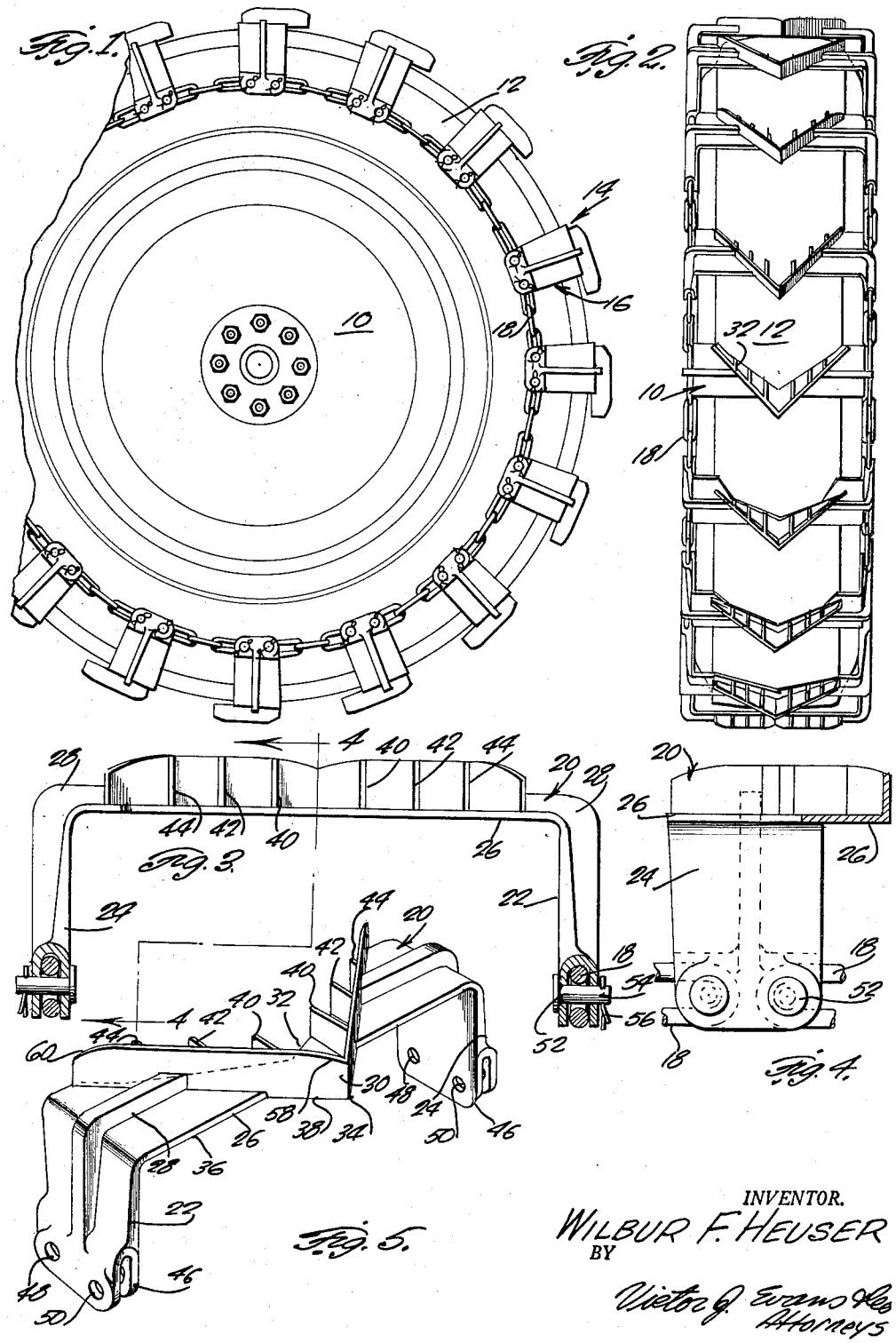
INVENTOR.
WILBUR F. HEUSER
BY
Victor J. Evans & co
Attorneys

United States Patent Office 3,116,777
Patented Jan. 7, 1964

3,116,777
TRACTION PAD FOR A VEHICLE WHEEL
Wilbur F. Heuser, Germania, Pa.
Filed Oct. 9, 1962, Ser. No. 229,377
2 Claims. (Cl. 152—228)

The present invention relates to a traction pad for a vehicle generally and one which has use with tractor drive wheels.

An object of the present invention is to provide a traction pad for use in a tractor chain which enables the tractor to operate in wet grass, snow, mud, or other places where the ordinary tread of the tractor fails to provide adequate gripping action.

Another object of the present invention is to provide a traction pad for a tractor chain which has positive action, one which replaces wheel weights, one which may be used to advantage with farm tractors, self-propelled combines, road graders, corn pickers, and other farm equipment vehicles.

A further object of the present invention is to provide a traction pad which lends itself to manufacture by casting, using high tensile malleable iron, one which may be manufactured in quantity at reasonable cost, one which lends itself to quick assembly and disassembly on the tractor wheel, and one which is highly effective in action.

These and other objects and advantages of the present invention will be apparent from the following description when taken in the light of the annexed drawing, in which:

FIGURE 1 is an elevational view of a vehicle wheel with a traction chain installed thereon using the traction pad of the present invention, a portion of the wheel and chain being broken away, FIGURE 2 is another elevational view of the wheel assembly of FIGURE 1 shown at right angles to FIGURE 1, FIGURE 3 is an elevational view of the traction pad of the present invention removed from the wheel, portions of the pad and connecting chain links being shown in section, the pad being shown on an enlarged scale.

FIGURE 4 is a view taken on the line 4—4 of FIGURE 3, and

FIGURE 5 is a perspective view of one of the pads of the traction chain removed from the chain.

Referring in detail to the drawing in which like numerals indicate like parts, in FIGURE 1 the reference numeral 10 designates a vehicle wheel having a tire 12 thereon. The traction chain constructed according to the present invention is designated generally by the reference numeral 14 and it will be seen to consist in a plurality of spaced traction pads 16 connected together by chain links 18.

With reference to FIGURES 3 to 5, inclusive, it will be seen that the pads 16 consist in an inverted U-shaped member 20 having legs 22 and 24 in a bight 26. The legs 22 and 24 and the bight 26 are flat with a reinforcing rib 28 extending outwardly from each of the legs 22 and 24 and from the adjacent portion of the bight 26. An upright V-shaped wall 30 rises from the bight 26.

The bight 26 is provided with a cutaway portion 32 centrally thereof and the wall 30 is adjacent to and spaced away from the portion 32 as shown in FIGURE 5.

The cutaway portion 32 is also V-shaped but is at an angle greater than the angle of the wall 30, as shown in FIGURE 2.

The portion of the wall 30 adjacent the apex 34 projects beyond the adjacent edge 36 of the bight 26, such projecting portion being designated in FIGURE 5 by the numeral 38.

Rising from the bight 26 are a plurality of transversely arranged vertically disposed ribs 40, 42, and 44, on each side of the apex 34.

Each of the ribs 40, 42, and 44, has one end formed integrally with the wall 30 and has its other end terminating along the line of the cutaway portion 32.

Means is provided on the free end of each of the legs 22 and 24 for attachment thereto of a connector element. Specifically, this means includes bifurcated end portions 46 provided with a pair of holes 48 and 50 which receive therethrough pins 52 by means of which chain links 18 are secured to the legs 22 and 24.

Each pin 52 is provided with a hole 54 shown in dotted lines in FIGURE 3 through which extends a cotter pin 56 for locking the pin 52 in its associated hole 48 or 50.

In use, the traction pads 16 are easily and with facility attached to the chain links 18 and the whole is formed into a traction chain, as at 14, for installation upon the wheel 10 and tire 12.

The provision of the cutaway portion 32 in each of the bights 26 makes it easy to clean the chain of mud and debris. The reinforcing ribs 28 add traction to the device and the ribs 40, 42, and 44 provide against side slippage.

It will be noted that the wall 30 has its forward end adjacent the apex 34 slightly tapered, as at 58, and has its other ends, at 60, also tapered. This provides for smooth riding upon a hard surface or over an improved roadway.

While it was mentioned that malleable iron is the material from which the pad 16 of the present invention may be cast other materials may be used and numerous changes and modifications may be made in the invention without departing from the spirit thereof as set forth in the appended claims.

What is claimed is:

1. A traction pad for a vehicle wheel comprising an inverted U-shaped member having a flat bight and flat legs disposed at right angles to said bight, the side edges of said bight being parallel, one of said side edges having a V-shaped cutout portion, an upright V-shaped wall rising from said bight and disposed so that the free end of each of the legs of said wall is contiguous with the junction of the adjacent end of said cutout portion with said one side edge of said bight, the apex of said wall projecting beyond the other side edge of said bight, a plurality of transversely arranged vertically disposed ribs arranged in spaced relation within the space between said wall and said cutout portion, each of said ribs having one end formed integrally with said wall, the free end of each leg of said member being bifurcated and provided with an opening for a connector pin for attachment thereto of a link of a chain.

2. The traction pad according to claim 1 together with a reinforcing rib formed integrally with each leg and with the portion of said bight exteriorly of said wall on each side thereof.

References Cited in the file of this patent

UNITED STATES PATENTS

| D. 52,331 | Loew | Aug. 27, 1918 |
| 1,606,637 | Hogan et al. | Nov. 9, 1926 |
| 3,002,545 | Newcomb | Oct. 3, 1961 |

FOREIGN PATENTS

| 514,188 | France | Nov. 13, 1920 |
| 819,459 | Great Britain | Sept. 2, 1959 |